United States Patent
Nadendla et al.

(10) Patent No.: US 11,537,456 B2
(45) Date of Patent: Dec. 27, 2022

(54) SELECTIVELY EXPOSING APPLICATION PROGRAMMING INTERFACES DYNAMICALLY FOR MICROSERVICES

(71) Applicant: Zscaler, Inc., San Jose, CA (US)

(72) Inventors: Arvind Nadendla, San Jose, CA (US); Subramanian Srinivasan, Milpitas, CA (US); Vivek Dhiman, Mohali (IN)

(73) Assignee: Zscaler, Inc., San Jose, CA (US)

( * ) Notice: Subject to any disclaimer, the term of this patent is extended or adjusted under 35 U.S.C. 154(b) by 61 days.

(21) Appl. No.: 17/084,091

(22) Filed: Oct. 29, 2020

(65) Prior Publication Data

US 2022/0083407 A1  Mar. 17, 2022

(30) Foreign Application Priority Data

Sep. 16, 2020  (IN) .............................. 202011040169

(51) Int. Cl.
  *G06F 9/54* (2006.01)
  *G06F 9/48* (2006.01)
  *G06F 9/50* (2006.01)

(52) U.S. Cl.
  CPC ............ *G06F 9/547* (2013.01); *G06F 9/4881* (2013.01); *G06F 9/5011* (2013.01)

(58) Field of Classification Search
  CPC ....... G06F 9/4881; G06F 9/5011; G06F 9/547
  See application file for complete search history.

(56) References Cited

U.S. PATENT DOCUMENTS

| | | | |
|---|---|---|---|
| 9,087,322 B1* | 7/2015 | Graham | H04L 67/565 |
| 10,015,167 B1* | 7/2018 | O'Kennedy | H04L 63/061 |
| 10,616,180 B2 | 4/2020 | Chanak et al. | |
| 11,153,412 B1* | 10/2021 | Varadan | H04L 67/133 |
| 2010/0211631 A1* | 8/2010 | Lee | H04L 61/4552 |
| | | | 709/203 |
| 2015/0095923 A1* | 4/2015 | Sarid | G06F 9/547 |
| | | | 719/328 |
| 2016/0164953 A1* | 6/2016 | Hristov | G06F 16/18 |
| | | | 709/203 |
| 2017/0193117 A1* | 7/2017 | Reigen | G06F 3/0482 |
| 2017/0289307 A1* | 10/2017 | Thompson | G06F 9/5038 |
| 2019/0213057 A1* | 7/2019 | Nitta | G06F 16/90335 |
| 2019/0312792 A1 | 10/2019 | Srinivasan | |
| 2019/0334789 A1* | 10/2019 | Roche | G06N 20/00 |
| 2022/0036352 A1* | 2/2022 | De Vos | G06Q 20/3223 |

* cited by examiner

*Primary Examiner* — Jeong S Park

(74) *Attorney, Agent, or Firm* — Clements Bernard Baratta; Lawrence A. Baratta, Jr.; Ryan Odessa

(57) ABSTRACT

Systems and methods for selectively exposing Application Programming Interfaces (APIs) dynamically and in a scalable manner include, when a new API is exposed in a microservice, making it accessible via a gateway if it is indicated to be exposed. The present disclosure focused on exposing a range of services behind the API gateway in a scalable, easy to use manner. The present disclosure includes an API gateway that supports a new microservice easily and efficiently as long as it provides metadata. The API gateway dynamically decides which APIs will be exposed via the gateway with filtering per service. Also, the API gateway routes any request made by a user to the gateway back to the intended microservice in a transparent fashion, as well as performing any additional transformations of the request before sending it back to the microservice.

17 Claims, 4 Drawing Sheets

SELECTIVELY EXPOSING APPLICATION PROGRAMMING INTERFACES DYNAMICALLY FOR MICROSERVICES

FIELD OF THE DISCLOSURE

The present disclosure relates generally to networking and computing. More particularly, the present disclosure relates to systems and methods for selectively exposing Application Programming Interfaces (APIs) dynamically for microservices.

BACKGROUND OF THE DISCLOSURE

Microservices are a variant of a Service-Oriented Architecture (SOA) used to build distributed software systems. The principles of service-orientation are independent of any vendor, product, or technology. A service is a self-contained unit of functionality, and services can be combined to provide the functionality of a large software application. Every computer can run any number of services, and each service is built in a way that ensures that the service can exchange information with any other service in the network without human interaction and without the need to make changes to the underlying program itself. Services in a Microservice Architecture (MSA) are processes that communicate with each other over the network to fulfill an objective, and these services use technology-agnostic protocols.

With the advent of microservices, there has been an explosion in the number of services designed to do exactly one responsibility (authentication, analytics, etc.). While each service does its job well, there is a need for the end-user to be presented with a single interface (referred to herein as a gateway or a gateway interface) for using the microservices in the backend. The microservices themselves have a lot of validation and other logic that can be used without needing to replicate that same logic in the gateway interface. There is a need to dynamically and efficiently expose the APIs provided by the individual microservices in a scalable manner. If a new API is exposed in the microservice, there is a need for it to be immediately accessible via that gateway if that is indicated to be exposed via the gateway.

BRIEF SUMMARY OF THE DISCLOSURE

The present disclosure relates to systems and methods for selectively exposing Application Programming Interfaces (APIs) dynamically and in a scalable manner. When a new API is exposed in a microservice, the present disclosure includes making it accessible via a gateway if it is indicated to be exposed via the gateway. The present disclosure focused on exposing a range of services behind the API gateway in a scalable, easy to use manner. The present disclosure includes an API gateway that supports a new microservice easily and efficiently as long as it provides metadata. The API gateway dynamically decides which APIs will be exposed via the gateway with filtering per service. Also, the API gateway routes any request made by a user to the gateway back to the intended microservice in a transparent fashion, as well as performing any additional transformations of the request before sending it back to the microservice.

In an embodiment, a non-transitory computer-readable storage medium having computer-readable code stored thereon for programming one or more processors to perform steps of receiving Application Programming Interface (API) metadata from one or more microservices; selectively exposing APIs associated with the one or more microservices to a user based on the API metadata; and routing a request from the user to an intended microservice in a transparent fashion to the user. The steps can further include transforming the request from the user prior to routing to the intended microservice; and transforming a response from the intended microservice prior to sending back to the user. The transforming the request can include changing a first term in the request to a second term for the microservice, and wherein the transforming the response includes changing the second term in the response to the first term. The selectively exposing the APIs can be based on filtering for the one or more microservices. The filtered APIs can be any of not fully supported and internal only. The filtering can be based on tags added in the API metadata. The routing the request can be performed without validating the request such that the intended microservice performs validation.

In another embodiment, a method includes receiving Application Programming Interface (API) metadata from one or more microservices; selectively exposing APIs associated with the one or more microservices to a user based on the API metadata; and routing a request from the user to an intended microservice in a transparent fashion to the user. The method can further include transforming the request from the user prior to routing to the intended microservice; and transforming a response from the intended microservice prior to sending back to the user. The transforming the request can include changing a first term in the request to a second term for the microservice, and wherein the transforming the response includes changing the second term in the response to the first term. The selectively exposing the APIs can be based on filtering for the one or more microservices. The filtered APIs can be any of not fully supported and internal only. The filtering can be based on tags added in the API metadata. The routing the request can be performed without validating the request such that the intended microservice performs validation.

In a further embodiment, an apparatus includes one or more processors and memory comprising instructions that, when executed, cause the one or more processors to receive Application Programming Interface (API) metadata from one or more microservices; selectively expose APIs associated with the one or more microservices to a user based on the API metadata; and route a request from the user to an intended microservice in a transparent fashion to the user. The instructions can further cause the one or more processors to transform the request from the user prior to routing to the intended microservice; and transform a response from the intended microservice prior to sending back to the user. The request can be transformed by changing a first term in the request to a second term for the microservice, and wherein the response can be transformed by changing the second term in the response to the first term. The APIs can be selectively exposed based on filtering for the one or more microservices. The filtered APIs can be any of not fully supported and internal only. The filtering can be based on tags added in the API metadata.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for selectively exposing Application Programming Interfaces (APIs) dynamically and in a scalable manner. When a new API is exposed in a microservice, the present disclosure includes making it accessible via a gateway if it is indicated to be exposed via the gateway. The present disclosure focused on exposing a range of services behind the API gateway in a scalable, easy to use manner. The present disclosure includes an API gateway that supports a new microservice easily and efficiently as long as it provides metadata. The API gateway dynamically decides which APIs will be exposed via the gateway with filtering per service. Also, the API gateway routes any request made by a user to the gateway back to the intended microservice in a transparent fashion, as well as performing any additional transformations of the request before sending it back to the microservice.

Figure 1:
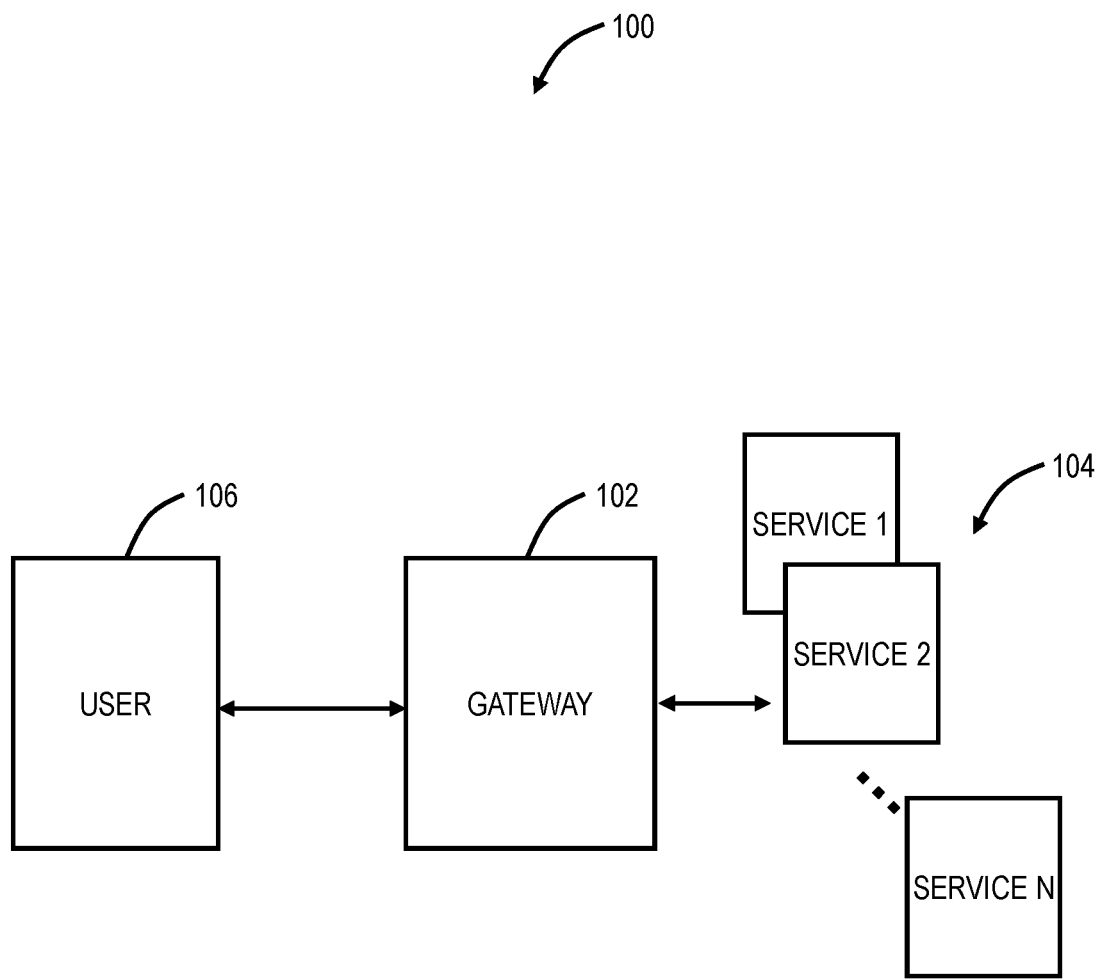
FIG. 1 is a logical diagram of a system including an API gateway for exposing microservices to a client.

FIG. 1 is a logical diagram of a system 100, including an API gateway 102 for exposing microservices 104 to a user 106. These components 102, 104, 106 in the system 100 are implemented through software executed on a processing device, service, cluster, etc. as well as instructions stored in a non-transitory computer-readable medium. FIG. 1 provides a logical view of connectivity between the components 102, 104, 106. The microservices 104 can be designed to expose metadata about the APIs which it provides. There are existing frameworks that allow one to generate this API metadata, but it may not be desirable to expose all the APIs to the end-user 106 even if they are part of the API metadata. Filtering may be requested because the API is not fully supported or because it is expected to be internal only, etc. The present disclosure utilizes the API metadata from an existing range of microservices 104 to generate new metadata which is used to 1) support a new microservice easily as long as it provides its metadata, 2) dynamically decide which APIs will be exposed via the API gateway 102 that is a gateway (filtering) per service, 3) route any request made by the user 106 to the gateway 102 back to the intended microservice 104 in a transparent fashion, and 4) perform any additional transformations of the request before sending it back to the microservice 104.

While generating the new metadata, it is possible to filter out APIs to hide from the user 106 using the gateway 102. The filtering can be requested by the microservice 104 by adding additional tags in the API metadata it provides to the gateway 102. So, there are no changes required on the gateway 102 and minimal modifications required on the microservice 104. It is also possible to route/proxy the request back to the appropriate microservice 104 without needing to validate the request on the gateway 102 and has the microservice 104 do the relevant validations (as it knows best). Any validation errors and context that the microservice 104 provides will be reported back to the user 106. Since the gateway 102 is acting as a proxy for the initial request made by the user 106, it is also able to transform the request in whatever fashion is needed by the microservice 104. For example, if the microservice 104 uses internal terminology in the APIs and the users are more familiar with the user-friendly terminology, it is possible to transform the user-friendly terminology to the internal terminology and vice versa.

Definitions

A microservice 104 is software executed on one or more processors for performing some task in combination with other microservices, via a network. The terms services and microservices can be used interchangeably herein. Services in a microservice architecture can be independently deployment, can be organized around some functionality, etc. Each service can be implemented using different programming languages, databases, hardware, etc. based on any criteria. Of note, services are small in size and work together for larger functionality.

An API is an interface that defines interactions between software components, such as the microservices 104. For example, the API defines the kinds of calls or requests that can be made, how to make them, the data formats that should be used, the conventions to follow, etc. It can also provide extension mechanisms so that users can extend existing functionality in various ways and to varying degrees.

A gateway 102 is a service and can also be referred to as an API gateway. The API gateway is an API management tool that sits between a client (e.g., a User Interface (UI)) and backend services. The gateway is configured as a reverse proxy to accept API calls, aggregate the various services required to fulfill them and return the appropriate result. Of note, the gateway is an existing concept, and the present disclosure extends the functionality of the gateway in terms of how it exposes the services.

Metadata refers to data that provides information about other data. In the present disclosure, metadata refers to information about the API associated with a service. A service provides metadata about its API, the present disclosure includes a transformation of the metadata, which can include filtering out the APIs.

An example use case of the gateway 102 of the present disclosure includes where a component within code is referred to as a first term, e.g., "Assistant," and the user 106, e.g., a client (UI), the component is exposed as another second term, e.g., "Connector." With the gateway 102, the user 106 is free to make the calls using the "Connector" terminology and the gateway 102 will transparently change it to "Assistant" when calling the intended microservice 104 and do the reverse when sending back a response.

Figure 2:
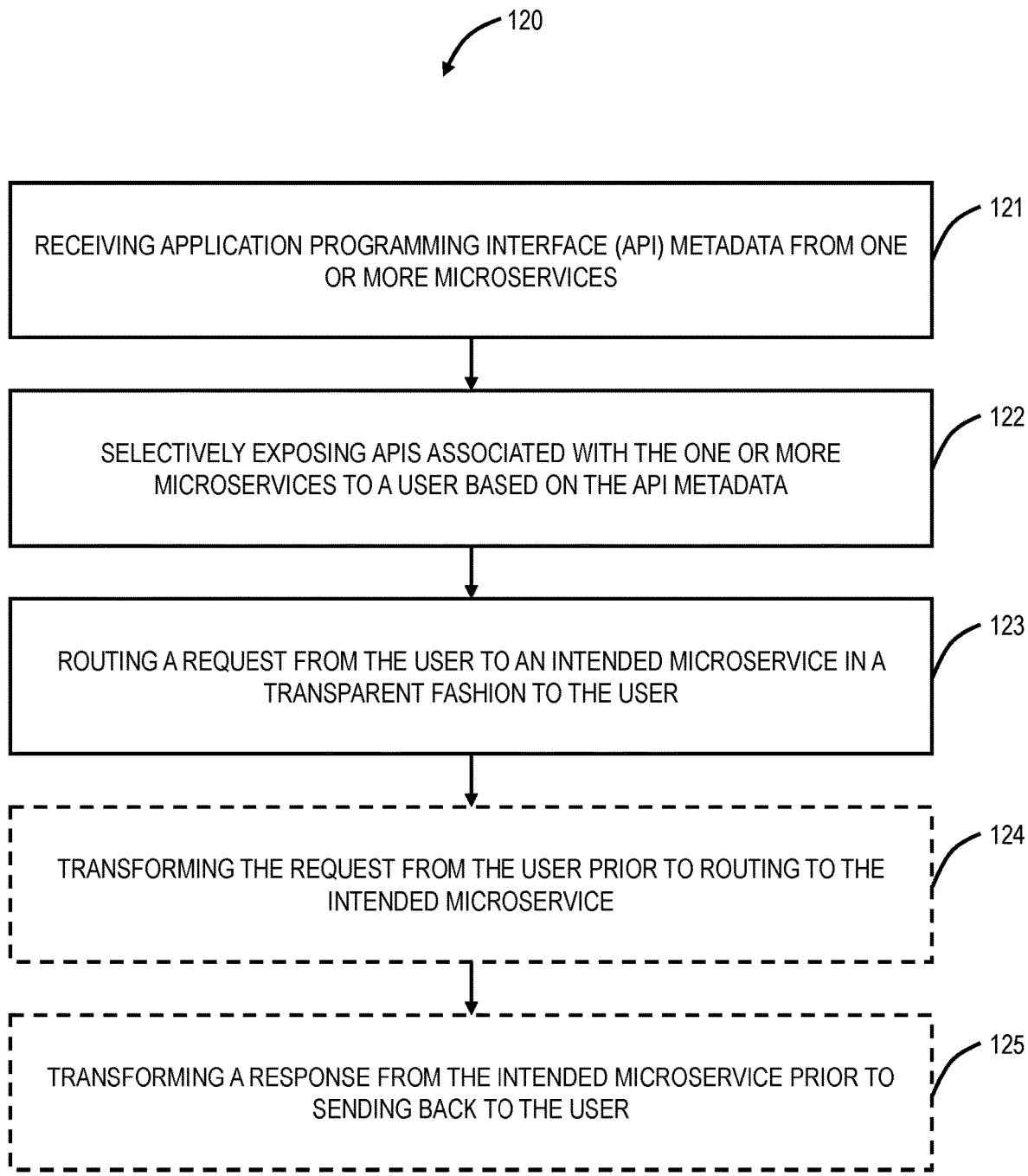
FIG. 2 is a flowchart of a process for selective exposing APIs via a gateway.

FIG. 2 is a flowchart of a process 120 for selective exposing APIs via a gateway 102. The process 120 can be a computer-implemented method, implemented via a processing device (such as the processing device 200 in FIG. 4), and embodied as computer-readable code stored in a non-transitory computer-readable storage medium for programming one or more processors to perform the process 120.

The process 120 includes receiving Application Programming Interface (API) metadata from one or more microservices (step 121); selectively exposing APIs associated with the one or more microservices to a user based on the API metadata (step 122); and routing a request from the user to an intended microservice in a transparent fashion to the user (step 123). The process 120 can further include transforming the request from the user prior to routing to the intended microservice (step 124); and transforming a response from the intended microservice prior to sending back to the user (step 125). The transforming the request can include changing a first term in the request to a second term for the microservice, and the transforming the response can include changing the second term in the response to the first term.

The selectively exposing the APIs can be based on filtering for the one or more microservices. The filtered APIs can be any of not fully supported and internal only. The filtering can be based on tags added in the API metadata. The routing the request is can be performed without validating the request such that the intended microservice performs validation.

Figure 3:
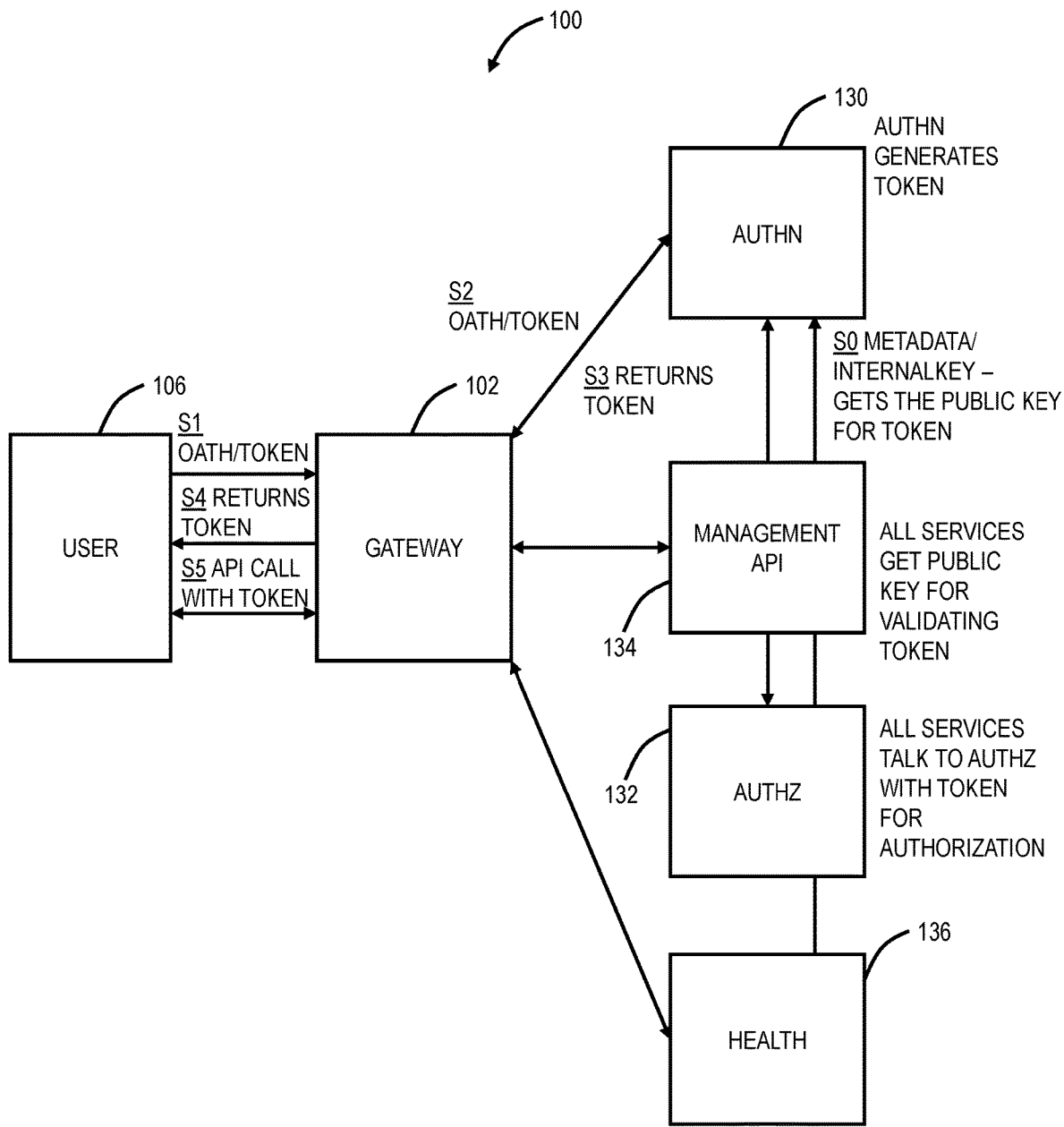
FIG. 3 is a logical diagram of the system of FIG. 1 including the API gateway for exposing microservices to the user to illustrate authentication.

FIG. 3 is a logical diagram of the system 100 including the API gateway 102 for exposing microservices to the user 106 to illustrate authentication. The system 100 includes an authentication service (AUTHN) 130, and an authorization service (AUTHZ) 132, a management API 134, and a health service 136. Note, there are the microservices 104 as well, but these are omitted in FIG. 3. Also, the services 130, 132, 136 and the API 134 can be microservices 104.

The system 100 includes an OAuth2 (Open Authorization) compliant API for authentication, see, e.g., RFC 6749 "The OAuth 2.0 Authorization Framework," October 2012, the contents of which are incorporated by reference. The gateway 102 is configured to offload transformations between the user 106 and the microservices 104 as well as limiting API access to the microservices 104. The gateway 102 can mark individual API calls as public, etc.

The authentication service 130 will be the sole generator of any kind of tokens. The gateway 102 will pass the token back to the appropriate microservices 104. The microservices which consume the token will ask for authentication from the AUTHN 130 for the public key to validate the token. The key rotation of the AUTHN 130 service can be done on a time cadence (dictated by OPS). The microservices 104 will talk to AUTHZ 132 service for checks to see if token presented can access certain microservices 104.

An example flow includes an OAuth/token from the user 106 to the gateway 102 (step S1). The gateway 102 sends the OAuth/token to the AUTHN 130 service (step S2), which generates a token and returns the token to the gateway 102 (step S3). The gateway 102 returns the token to the user 106 (step S4). Finally, the user 106 include the token in any API calls through the gateway 102 (step S5).

Prior to step S1, the metadata/internal key is provided between the AUTHZ 132 service and the AUTHN 130, such as via the management API 134. All of the microservices 104 can communicate with the AUTHZ 132 service for authorization.

The gateway 102 includes various advantages such as flexibility with respect to API transformations, provides efficiency in testing and release management, can be a proxy for other services as a single-entry point for the user 106 for all microservices 104.

Example Processing Device Architecture

Figure 4:
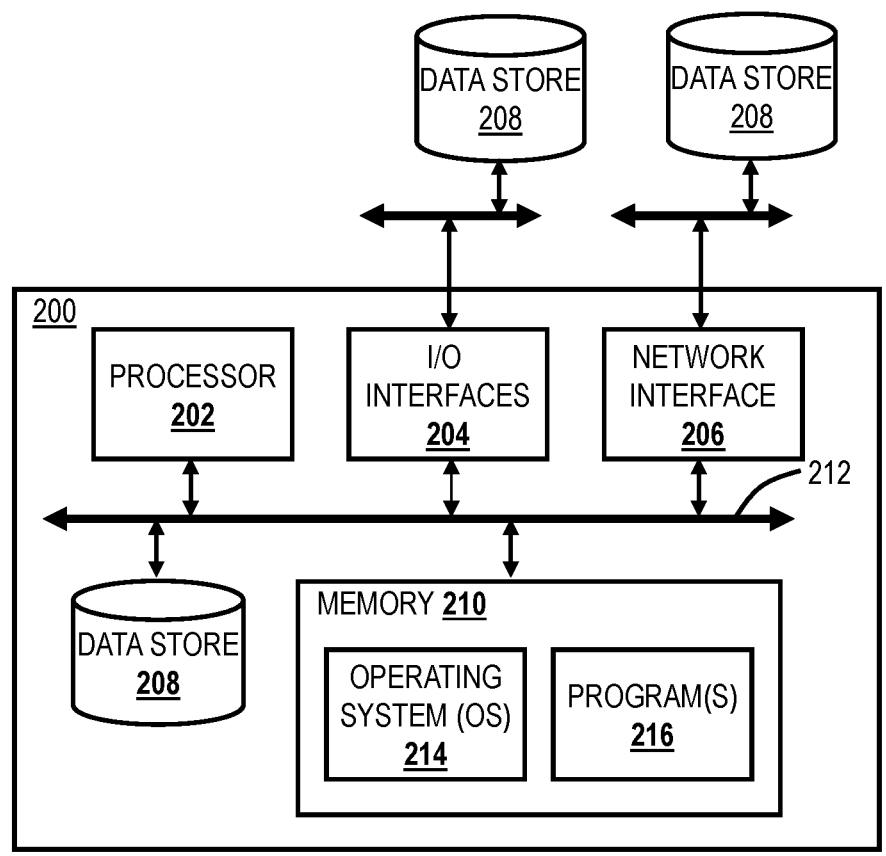
FIG. 4 is a block diagram of a processing device.

FIG. 4 is a block diagram of a processing device 200. The processing device 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the processing device 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the processing device 200, a semiconductor-based microprocessor (in the form of a microchip or chipset), or generally any device for executing software instructions. When the processing device 200 is in operation, the processor 202 is configured to execute software stored within the memory 210, to communicate data to and from the memory 210, and to generally control operations of the processing device 200 pursuant to the software instructions. The I/O interfaces 204 may be used to receive user input from and/or for providing system output to one or more devices or components.

The network interface 206 may be used to enable the processing device 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the processing device 200, such as, for example, an internal hard drive connected to the local interface 212 in the processing device 200. Additionally, in another embodiment, the data store 208 may be located external to the processing device 200, such as, for example, an external hard drive connected to the I/O interfaces 204 (e.g., SCSI or USB connection). In a further embodiment, the data store 208 may be connected to the processing device 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer-readable code stored thereon for programming one or more processors to perform steps of:
   receiving Application Programming Interface (API) metadata from one or more microservices;
   utilizing the API metadata to generate new metadata, wherein the new metadata is used to support a new microservice which provides its metadata, dynamically decide API exposure, route requests, and perform any transformations of the requests;
   selectively exposing APIs associated with the one or more microservices to a user based on one or more of the API metadata, and filtering APIs to hide from the user for the one or more microservices; and
   routing a request from the user to a gateway and back to an intended microservice in a transparent fashion to the user, wherein the intended microservice is identified based on the exposed APIs.

2. The non-transitory computer-readable storage medium of claim 1, wherein the steps further include
   transforming the request from the user prior to routing to the intended microservice; and
   transforming a response from the intended microservice prior to sending back to the user.

3. The non-transitory computer-readable storage medium of claim 2, wherein the transforming the request includes changing a first term in the request to a second term for the microservice, and wherein the transforming the response includes changing the second term in the response to the first term.

4. The non-transitory computer-readable storage medium of claim 1, wherein the filtered APIs are any of not fully supported and internal only.

5. The non-transitory computer-readable storage medium of claim 1, wherein the filtering is based on tags added in the API metadata.

6. The non-transitory computer-readable storage medium of claim 1, wherein the routing the request is performed without validating the request such that the intended microservice performs validation.

7. A method comprising:
   receiving Application Programming Interface (API) metadata from one or more microservices;
   utilizing the API metadata to generate new metadata, wherein the new metadata is used to support a new microservice which provides its metadata, dynamically decide API exposure, route requests, and perform any transformations of the requests;
   selectively exposing APIs associated with the one or more microservices to a user based on one or more of the API metadata, and filtering APIs to hide from the user for the one or more microservices; and
   routing a request from the user to a gateway and back to an intended microservice in a transparent fashion to the user, wherein the intended microservice is identified based on the exposed APIs.

8. The method of claim 7, further comprising
   transforming the request from the user prior to routing to the intended microservice; and
   transforming a response from the intended microservice prior to sending back to the user.

9. The method of claim 8, wherein the transforming the request includes changing a first term in the request to a second term for the microservice, and wherein the transforming the response includes changing the second term in the response to the first term.

10. The method of claim 7, wherein the filtered APIs are any of not fully supported and internal only.

11. The method of claim 7, wherein the filtering is based on tags added in the API metadata.

12. The method of claim 7, wherein the routing the request is performed without validating the request such that the intended microservice performs validation.

13. An apparatus comprising:
one or more processors and memory comprising instructions that, when executed, cause the one or more processors to
receive Application Programming Interface (API) metadata from one or more microservices;
utilize the API metadata to generate new metadata, wherein the new metadata is used to support a new microservice which provides its metadata, dynamically decide API exposure, route requests, and perform any transformations of the requests;
selectively expose APIs associated with the one or more microservices to a user based on one or more of the API metadata, and filtering APIs to hide from the user for the one or more microservices; and
route a request from the user to an intended microservice in a transparent fashion to the user, wherein the intended microservice is identified based on the exposed APIs.

14. The apparatus of claim 13, wherein the instructions further cause the one or more processors to
transform the request from the user prior to routing to the intended microservice, and
transform a response from the intended microservice prior to sending back to the user.

15. The apparatus of claim 14, wherein the request is transformed by changing a first term in the request to a second term for the microservice, and wherein the response is transformed by changing the second term in the response to the first term.

16. The apparatus of claim 13, wherein the filtered APIs are any of not fully supported and internal only.

17. The apparatus of claim 1, wherein the filtering is based on tags added in the API metadata.

* * * * *